US011707174B2

(12) United States Patent
Nieschwitz et al.

(10) Patent No.: US 11,707,174 B2
(45) Date of Patent: Jul. 25, 2023

(54) VACUUM INLET VALVE ASSEMBLY WITH SLIDING PINS

(71) Applicant: H-P Products, Inc., Louisville, OH (US)

(72) Inventors: Darrell V. Nieschwitz, Louisville, OH (US); Greg A. Calderone, Canton, OH (US); Shawn C. Metz, Louisville, OH (US)

(73) Assignee: H-P PRODUCTS, INC., Louisville, OH (US)

( * ) Notice: Subject to any disclaimer, the term of this patent is extended or adjusted under 35 U.S.C. 154(b) by 255 days.

(21) Appl. No.: 17/172,197

(22) Filed: Feb. 10, 2021

(65) Prior Publication Data
US 2021/0244247 A1 Aug. 12, 2021

Related U.S. Application Data

(60) Provisional application No. 62/972,935, filed on Feb. 11, 2020.

(51) Int. Cl.
*A47L 9/24* (2006.01)
*A47L 5/38* (2006.01)
*F16L 5/02* (2006.01)

(52) U.S. Cl.
CPC ............... *A47L 9/242* (2013.01); *A47L 5/38* (2013.01); *F16L 5/027* (2013.01)

(58) Field of Classification Search
CPC ... F16L 15/027; F16L 25/0045; F16L 37/144; F16L 41/12; F16L 37/086; F16L 37/1225; A47L 9/242; A47L 5/38; Y10S 285/903
See application file for complete search history.

(56) References Cited

U.S. PATENT DOCUMENTS

| | | | |
|---|---|---|---|
| 2,522,075 A | * | 9/1950 | Van Der Heem ..... F16L 37/084 285/317 |
| 2,953,806 A | | 7/1958 | Walker |
| 3,464,858 A | * | 9/1969 | Hamrick ................ A47L 5/38 137/355.16 |
| 3,520,725 A | | 7/1970 | Hamrick |
| 4,336,427 A | | 6/1982 | Lindsay |
| 4,423,891 A | * | 1/1984 | Menges ................ F16L 37/144 285/305 |

(Continued)

FOREIGN PATENT DOCUMENTS

| | | | | |
|---|---|---|---|---|
| CA | 1266356 A | * | 3/1990 | ............... A47L 5/38 |
| KR | 19990029152 U | * | 7/1999 | |

*Primary Examiner* — Zachary T Dragicevich
*Assistant Examiner* — Alexander T Rufrano
(74) *Attorney, Agent, or Firm* — Sand, Sebolt & Wernow Co., LPA

(57) ABSTRACT

A locking sleeve for connection with a valve box assembly of a central vacuum system includes, a first end adapted to couple to a wall of a valve box assembly, a second end opposite the first end, a central vertical axis between the first end and the second end, a first side adapted to be adjacent to a rear wall of a valve box assembly, a second side opposite the first side, a central horizontal axis between the first side and the second side, a slidable locking mechanism moveable in a sliding manner. The slidable locking mechanism is adapted to secure a vacuum hose assembly to the valve box assembly of the central vacuum system.

3 Claims, 8 Drawing Sheets

(56) References Cited

U.S. PATENT DOCUMENTS

| | | | | |
|---|---|---|---|---|
| 4,904,000 A | * | 2/1990 | Matsui | H02G 3/0691 |
| | | | | 285/305 |
| 4,919,462 A | * | 4/1990 | Matsui | H02G 3/0691 |
| | | | | 285/133.11 |
| 6,459,056 B1 | | 10/2002 | Graham | |
| 7,010,829 B2 | | 3/2006 | Harman et al. | |
| 7,624,472 B2 | | 12/2009 | Ambrose | |
| 7,677,608 B2 | * | 3/2010 | Takayanagi | F16L 37/144 |
| | | | | 285/305 |
| 7,967,070 B2 | * | 6/2011 | Reddy | F16L 1/123 |
| | | | | 166/341 |
| 3,001,650 A1 | | 8/2011 | Trotter | |
| 9,078,550 B2 | * | 7/2015 | Pruitt | A47L 9/106 |
| 2016/0367095 A1 | * | 12/2016 | Bruneau | A47L 9/244 |
| 2017/0332858 A1 | * | 11/2017 | Nieschwitz | A47L 9/244 |

* cited by examiner

VACUUM INLET VALVE ASSEMBLY WITH SLIDING PINS

CROSS REFERENCE TO RELATED APPLICATIONS

The present disclosure claims priority to and the benefit of U.S. Provisional Application Ser. No. 62/972,935 field on Feb. 11, 2020, the entirety of which is incorporated herein by reference.

TECHNICAL FIELD

The present disclosure relates to inlet valve assemblies of central vacuum cleaning systems. Specifically, the present disclosure relates to a locking sleeve that couples to an inlet valve assembly.

BACKGROUND

Central vacuum systems may be used in a home, a recreational vehicle, or in a commercial setting. These systems comprise of a main vacuum source usually located in a basement or an adjacent location. The vacuum source is connected to various inlet valves located throughout a building via conduits or tubing. The inlet valves, or valve boxes as they are referred to in the industry, are mounted in a wall, inside a cabinet, or in other structures, by various flanges or brackets. Some examples are shown in U.S. Pat. Nos. 2,953,806, 3,520,725, 4,336,427, 6,459,056, and 7,624,472.

Many vacuum systems use a hose that is slidably moveable and contained within the vacuum conduit and expandable therefrom so that the hose is pulled from the conduit for cleaning an area and then retracted back into the vacuum conduit for storage. Some examples of such systems are shown in U.S. Pat. Nos. 2,953,806, 7,010,829, and 8,001,650. These systems have a debris pickup nozzle which is attached to the end of the hose and is retained in or stored closely to the inlet valve when not in use. These systems include a locking mechanism to secure the hose in an extend positon. Other systems include a hose that is stored outside of the conduit in a storage unit near an inlet valve assembly. With these systems, the hose may be removed from the storage unit and pushed into an inlet valve.

Generally, in order to use a central vacuum cleaning system, a hose stored near an inlet valve is removed from storage or a retractable hose stored in a conduit of a central vacuum cleaning system is fully extended or completely removed from the conduit. The locking mechanism located on an inlet valve interacts with a hose cuff located on a hose thereby locking the hose in an extended position to prevent the hose from being removed from an inlet valve. Unfortunately, the locking mechanism may be adapted to locking the hose in only one fully extended position. As a result, all of the hose is removed from the conduit and placed on the floor the user is vacuuming which may cause a user to trip over the hose. If a user wants to extend less than all of the hose from the inlet valve assembly, the locking mechanism will not lock the hose in place. Thus it is desirable to provide a locking mechanism that locks the hose in place at different lengths.

SUMMARY

Currently, retractable hose assemblies of a central vacuum system may be slid into a fully extended position in order to lock the hose assembly to an inlet valve assembly in order to use the central vacuum system. As a result, all of the hose is removed or extended from a conduit in communication with the inlet valve assembly and placed on the floor of a room a user is vacuuming. Thus, there is a continuous need for a locking mechanism that allows a user to retract less than all of the hose assembly from the inlet valve assembly when a user would like to use the central vacuum system. To address this continuing need, the present disclosure provides a locking sleeve that is capable of locking a hose assembly to an inlet valve assembly at various positions. The sleeve includes a slidable locking mechanism adapted to secure a vacuum hose assembly to the valve box assembly of the central vacuum system at various positions. As such, aspects of the present disclosure relate to an improved locking sleeve that secures a hose assembly to an inlet valve assembly at various positons.

In one aspect, an exemplary embodiment of the present disclosure may provide a locking sleeve for connection with a valve box assembly of a central vacuum system. The locking sleeve may include a first end adapted to couple to a wall of a valve box assembly, a second end opposite the first end, a central vertical axis between the first end and the second end, a first side adapted to be adjacent to a rear wall of a valve box assembly, a second side opposite the first side, a central horizontal axis between the first side and the second side, and a slidable locking mechanism moveable in a sliding manner. The slidable locking mechanism may be adapted to secure a vacuum hose assembly to the valve box assembly of the central vacuum system. This exemplary embodiment or another exemplary embodiment may further provide wherein the slidable locking mechanism is moveable or slidable in a direction parallel to the central horizontal axis. This exemplary embodiment or another exemplary embodiment may further provide wherein the slidable locking mechanism comprises: a first locking member; and a different second locking member. This exemplary embodiment or another exemplary embodiment may further provide wherein the slidable locking mechanism is moveable or slidable between a first position, a second position, and a third position, wherein when the slidable locking mechanism is in the first position, the first locking member and the different second locking member are not adapted to couple to the hose assembly. This exemplary embodiment or another exemplary embodiment may further provide wherein when the slidable locking mechanism is in the second position, the first locking member is adapted couple to the hose assembly. This exemplary embodiment or another exemplary embodiment may further provide wherein the first locking member is adapted to couple to a hose cuff of the vacuum hose assembly. This exemplary embodiment or another exemplary embodiment may further provide wherein the slidable locking mechanism further comprises: a spring mechanism coupled to the first locking member that applies a force to the to the first locking member. This exemplary embodiment or another exemplary embodiment may further provide wherein when the slidable locking mechanism is in the third position, the second different locking member is adapted to couple to the hose assembly. This exemplary embodiment or another exemplary embodiment may further provide wherein the different second locking member is adapted to couple to a hose of the vacuum hose assembly.

In another aspect, an exemplary embodiment of the present disclosure may provide a method for locking a hose assembly to a valve box assembly of a central vacuum system. The method may include sliding a locking mechanism of the valve box assembly from an unlocked position to a locked position and coupling the hose assembly to the locking mechanism when the locking mechanism is in the locked position. This exemplary embodiment or another exemplary embodiment may further provide wherein the locking mechanism is slid along an axis perpendicular to a longitudinal axis of the hose assembly from the unlocked position to the locked position. This exemplary embodiment or another exemplary embodiment may further provide wherein the locking mechanism is moveable or slidable between a first locked position and a different second locked position that is further offset from the hose assembly along the axis perpendicular to the longitudinal axis of the hose assembly than the first locked position. This exemplary embodiment or another exemplary embodiment may further provide sliding the locking mechanism to the first locked position and coupling the locking mechanism to a hose cuff of the hose assembly when the locking mechanism is in the first locked position. This exemplary embodiment or another exemplary embodiment may further provide sliding the locking mechanism from the first locked position to the first locked positon, moving the hose assembly into the valve box assembly, sliding the locking mechanism to the second locked position from the first locked position, and coupling the locking mechanism to a hose of the hose assembly when the locking mechanism is in the different second locked position. This exemplary embodiment or another exemplary embodiment may further provide sliding the locking mechanism to the different second locked position and coupling the locking mechanism to a hose of the hose assembly when the locking mechanism is in the different second locked position.

In another aspect, an exemplary embodiment of the present disclosure may provide coupling a hose assembly to a locking mechanism of the valve box assembly when the locking mechanism is in a locked positon, sliding the locking mechanism from the locked position to an unlocked position, and unlocking the hose assembly from the valve box assembly after the locking mechanism has been slid to the unlocked position. This exemplary embodiment or another exemplary embodiment may further provide sliding the locking mechanism along an axis perpendicular to a longitudinal axis of the hose assembly from the locked position to the unlocked position, wherein the locked position is further offset from the hose assembly along the axis perpendicular to the longitudinal axis than the unlocked positon. This exemplary embodiment or another exemplary embodiment may further provide wherein the locking mechanism is slidable between a first locked position and a different second locked position that is further offset from the hose assembly along the axis perpendicular to the longitudinal axis of the hose assembly than the first locked position. This exemplary embodiment or another exemplary embodiment may further provide coupling the locking mechanism to a hose cuff of the hose assembly when the locking mechanism is in the first locked position, sliding the locking mechanism from the first locked position to the unlocked positon, and unlocking the hose cuff from the valve box assembly when the locking mechanism is in the unlocked position. This exemplary embodiment or another exemplary embodiment may further provide coupling the locking mechanism to a hose of the hose assembly when the locking mechanism is in the different second locked position, sliding the locking mechanism from the different second locked position to the unlocked position, and unlocking the hose from the valve box assembly when the locking mechanism is in the unlocked position.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
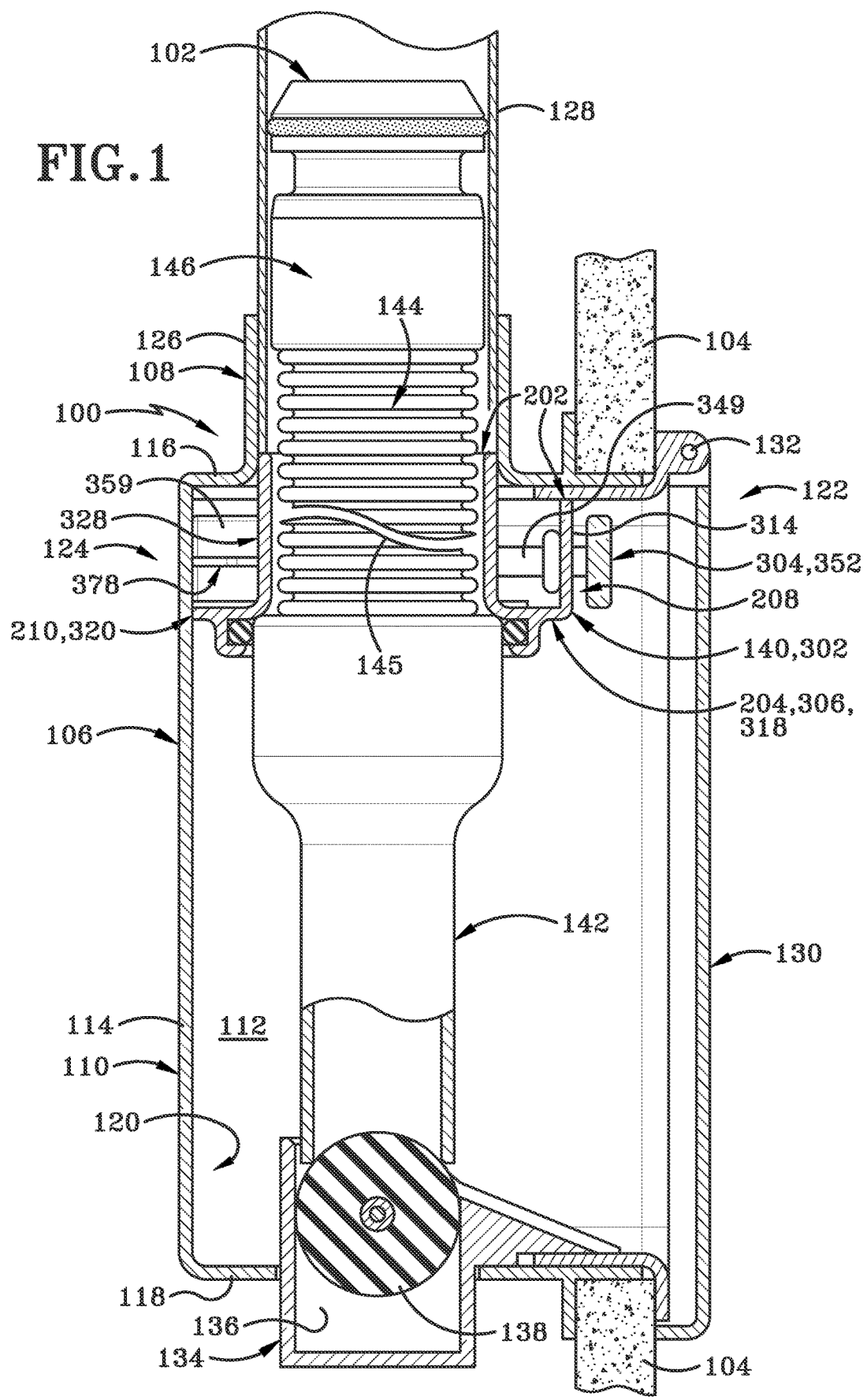
FIG. 1 is a cross sectional view of a valve box assembly with a locking sleeve coupled to a hose assembly of a central vacuum system.

FIG. 1 illustrates a valve box 100 and a hose assembly 102. The valve box 100 may be attached wall stud and accessible through an opening formed in an attached wall board 104, such as drywall used in a usual home construction. Valve box 100 can be used in various types of constructions.

Valve box 100 includes a main body or housing indicated generally at 106, formed by an upper portion 108 and a lower portion 110. Lower portion 110 is formed by a pair of side walls 112, a rear wall 114, a top wall 116 and a bottom wall 118. The side walls 112, the rear wall 114, the top wall 116, and the bottom wall 118 define an interior chamber 120, a front or outer end opening 122, and a rear end 124. Lower portion 110 preferably will have a rectangular shape as shown in FIG. 1. The upper portion 108 includes a cylindrical coupler 126 that slidably receives a conduit 128 that is connected to a vacuum source. The coupler 126 and the conduit 128 have a frictional interference fit or a fixed connection between them that helps retain the conduit 128 within the coupler 126.

An outer closure door 130 is pivotally mounted adjacent to top wall 116 of housing 106 for opening and closing front end opening 122 in order to conceal interior chamber 120 of lower portion 110 and to provide an attractive faceplate for valve box 100 when mounted to the wall board 104. Door 130 is pivotably mounted with respect to housing 106 by a pivot pin 132. A bottom bracket 134 extends from the bottom wall 118. The bottom bracket 134 forms a channel 136. A ball 138 rests within the channel 136.

The hose assembly 102 includes a debris pickup nozzle handle 142, a flexible hose 144, and a hose cuff 146. The flexible hose 144 is coupled to the debris pickup nozzle handle 142 and the hose cuff 146. The hose 144 is shown with broken line 145 which represents that hose 144 may be of any length. The hose cuff includes a first opening that is in open communication with the conduit 128 and a second opening that is in open communication with a first opening the hose 144. The hose 144 incudes a second opening that is in open communication with a first opening of the debris and pickup nozzle handle 142. The debris and pickup nozzle handle 142 includes a second opening that intakes debris when a central vacuum is in operation. When the hose assembly 102 is in a stored position (FIG. 1) the debris pickup nozzle handle 142 rests upon the ball 138, an end of the debris pickup nozzle handle 142 rests upon the locking sleeve 140 and the hose 144 extends through the locking sleeve 140 into the conduit 128.

In one particular embodiment, the hose assembly 102 interfaces with both a primary valve and a multiplicity of secondary inlet valves. Typically, when a central vacuum cleaning system has both primary and secondary inlet valves, the primary valve is a valve that stores a retractable hose assembly 102 (i.e., valve box 100). As such, the vacuum hose assembly 102 may be stored behind or within wall board 104 of the structure. This enables the hose assembly 102 to be extracted or retracted relative to the primary inlet valve. When the hose assembly 102 is in a retracted and stored position, either within or behind a wall, the debris pickup nozzle handle 142 of the hose assembly 102 may be extracted from the valve box 100. Then, the hose assembly 102 may be disconnected from the primary valve. Once the hose assembly 102 is disconnected, a user may carry the hose to another location within the structure to connect the hose assembly 102 with a secondary inlet valve.

Figure 2:
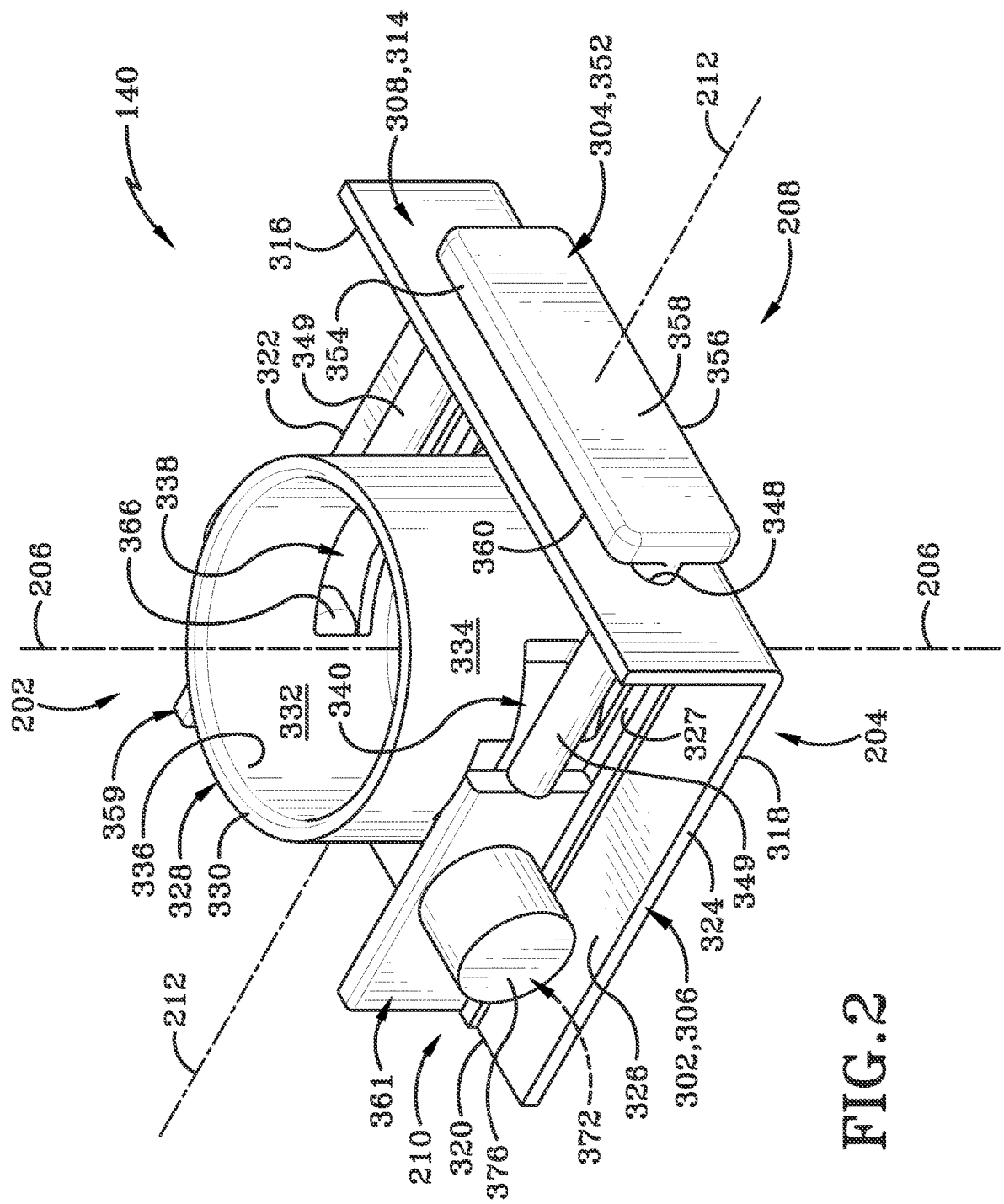
FIG. 2 is a perspective view of the locking sleeve shown in FIG. 1.

FIG. 2 depicts the locking sleeve 140. The locking sleeve 140 includes a first end 202, a second end 204 opposite the first end 202, a central vertical axis 206 between the first end 202 and the second end 204, a first side 208, a second side 210 opposite the first side 208, and a central horizontal axis 212 between the first side 208 and the second side 210. Some portions of the locking sleeve 140 will be described relative to the central vertical axis 206 or the central horizontal axis 212 and may be used in conjunction with the terms circumferential, or radial, relative to the central vertical axis 206 or the central horizontal axis 212.

Figure 3:
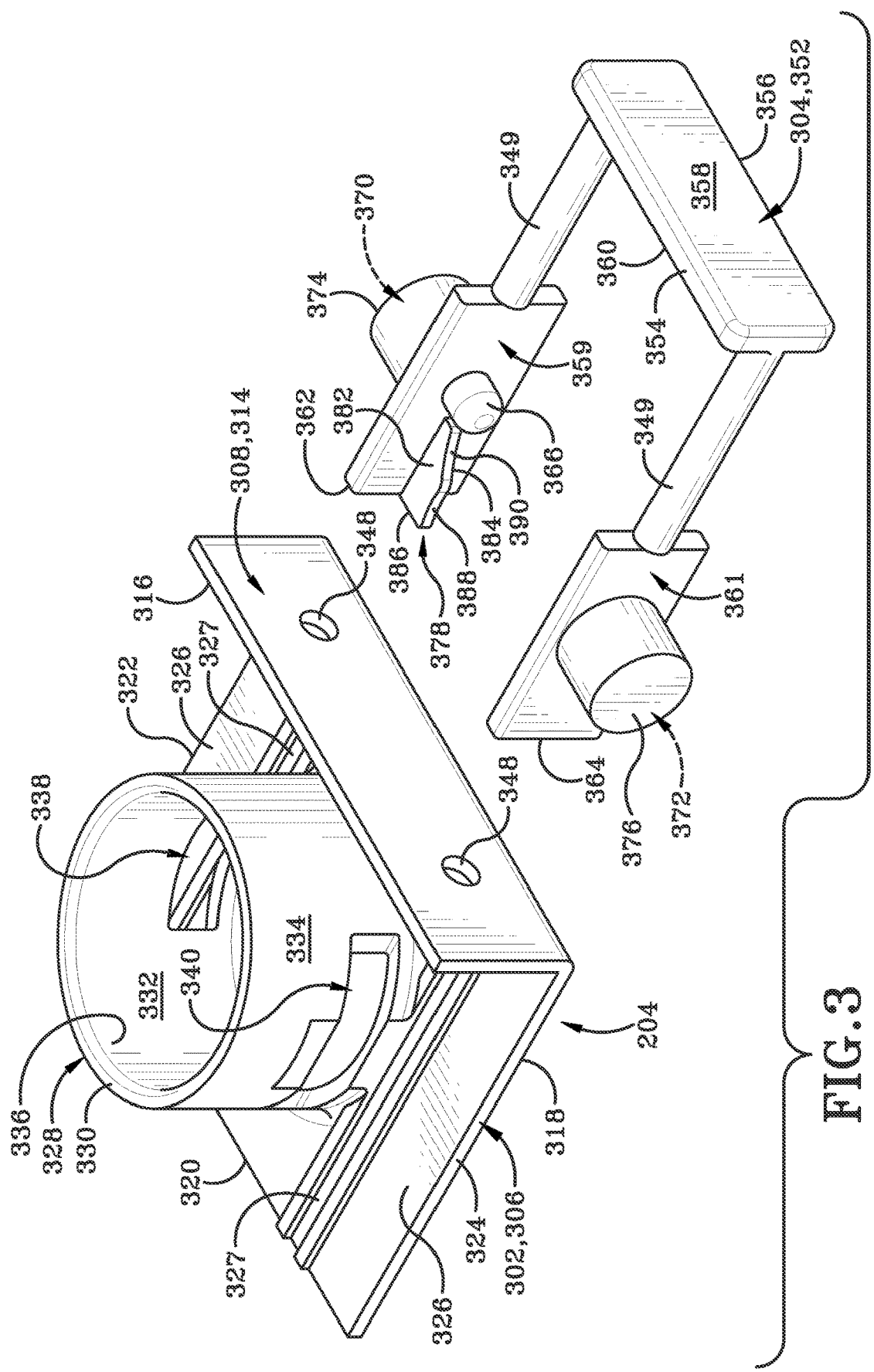
FIG. 3 is an exploded perspective view of the locking sleeve shown in FIG. 2.

FIG. 3 further depicts the locking sleeve 140. The locking sleeve 140 includes a locking mechanism housing 302 and a slidable locking mechanism 304. The locking mechanism housing 302 includes a horizontal planar first wall 306 and a vertically planar second wall 308. The first wall 306 extends horizontally relative to the vertical axis 206. When the locking sleeve 140 is installed in the valve box 100 (FIG. 1), the first wall 306 is adjacent or may abut the top wall 116. Surface 318 faces the bottom wall 118, the surface 314 faces the front end 122, the edge 320 abuts the rear wall 114, and a first side edge 322 and a second side edge 324 abut or are adjacent the side walls 112. Surface 314 faces away from the central vertical axis 206. Surface 316 is opposite the surface 314 and faces toward the central vertical axis 206.

Surface 318 extends from the surface 314 to the edge 320 and extends between the edge 322 and edge 324. Surface 314 extends longitudinally relative to the central vertical axis 206 from edge 322 to edge 324. Surface 326 extends from the surface 316 to edge 320 between edge 322 and edge 324. Surface 326 of the locking mechanism housing 302 defines two grooves 327. The two grooves 327 extend from edge 320 to surface 316 parallel to the central horizontal axis 212. The two grooves 327 have a width complementary to a width of apportion of the slidable locking mechanism 304. As a result, the slidable locking mechanism 304 nests and slides within the two grooves 327 when the slidable locking mechanism 304 is installed in the locking mechanism housing 302.

Surface 326 is generally perpendicular to the central vertical axis 206. Surface 314 and surface 316 are planar from the first end 202 towards the second end 204. However, in another embodiment, the surfaces 314, 316 may slope downward from the first end 202 towards the second end 204 and inward toward the central vertical axis 206.

The locking mechanism housing 302 further includes a cylindrical coupler 328. The coupler 328 extends longitudinally from the second surface 326 to an annular surface 330. The coupler defines a first surface 332 and a second surface 334 opposite the first surface 332. The first surface 332 and the second surface 334 extend circumferentially around and generally parallel to central vertical axis 206. The first surface 332 faces toward the central vertical axis 206 and the second surface 334 faces away from the central vertical axis 206. The first surface 332 extends longitudinally relative to the central vertical axis 206 from the annular surface 330 to the first surface 318 and defines a bore 336. When the locking sleeve 140 is installed in the valve box 100, the coupler 126 of the valve box 100 slidably receives the coupler 328 of the locking mechanism housing 302. The coupler 126 and the coupler 328 have a frictional interference fit between them that helps retain the coupler 328 within the coupler 126. Alternatively, the coupler 328 may be glued or mechanically attached to the coupler 126. Furthermore, when installed in the valve box 100, the annular surface 330 of the coupler 328 abuts the conduit 128. The hose assembly 102 extends from the conduct 128, through the bore 336 of the coupler 328 and into the chamber 120 of the valve box 100. The coupler 328 further defines a first slot 338 and a structurally identical second slot 340 that opposes the first slot 338 relative to the central vertical axis 206. Accordingly, for brevity, only the first slot 338 will be discussed below. The first slot 338 extends from the first surface 332 to the second surface 334 through the coupler 328.

Housing 302 has a width 350. The width 350 is measured between edge 322 and edge 324 through the central vertical axis 206. Two apertures 348 are formed in wall 308 and received arms 349 on mechanism 304. The width between the two apertures 348 is less than the width 350.

In one particular embodiment, the locking mechanism housing 302 is formed from a uniform, monolithic member formed from a suitably rigid material so as to withstand deformation when the hose assembly 102 of the present disclosure moves through the locking mechanism housing 302. The locking mechanism housing 302 may be fabricated from a polymer material; however other rigid materials are entirely contemplated. Furthermore, the integral structure of the locking mechanism housing 302 may be fabricated from multiple elements having similar configurations as one having skill in the art would understand.

The slidable locking mechanism 304 includes a generally U-shaped frame 352 that defines a first minor surface 354, a second minor surface 356, a first major surface 358, a second major surface 360, a third surface 362, and a fourth surface 364. The first minor surface 354 faces the first end 202 of the locking sleeve 140. The second minor surface 356 is opposite the first minor surface 354 and faces the second end 204 of the locking sleeve 140. The first major surface 358 faces away from the central vertical axis 206. The second major surface 360 is opposite the first major surface 358 and faces toward the central vertical axis 206. The third surface 362 and the fourth surface 364 face away from the central vertical axis 206.

The first minor surface 354 and the second minor surface 356 extend from side-to-side and extend between the first major surface 358 and the second major surface 360. The first minor surface 354 and the second minor surface 356 extend generally perpendicular to the central vertical axis 206. The first major surface 358 and the second major surface 360 extend longitudinally relative to the central vertical axis 206 from the third surface 362 to the fourth surface 364. The first major surface 358 and the second major surface 360 extend generally parallel to the central vertical axis 206. The third surface 362 and the fourth surface 364 extend longitudinally relative to the central vertical axis 206. The third surface 362 and the fourth surface 364 extend generally parallel to the central vertical axis 206.

The slidable locking mechanism 304 further includes a first locking member 366, a structurally identical second locking member 368 (FIG. 4) that opposes the first locking member 366, a first spring mechanism 370, and a structurally identical second spring mechanism 372. Accordingly, for brevity, only the first locking member 366 and the first spring mechanism 370 will be discussed below. The first locking member 366 extends inward relative the central vertical axis 206 from a wall 359 through a bore in the slidable locking mechanism 304. The first locking member 366 extends inward toward another wall 361 on the other side of the frame 352 relative to the central vertical axis 206. The first spring mechanism 370 and the second spring mechanism 372 extend outward relative to the central vertical axis 206 from wall 359 to a circular surface 374 and 376 respectively. The first spring mechanism 370 includes a compression spring (not shown). When the spring is in a decompressed or extended state, the first spring mechanism 370 applies a force perpendicular to the central vertical axis 206 to the first locking member 366 thereby fully extending the first locking member 366 through the bore.

The slidable locking mechanism 304 further includes a third locking member 378 and a structurally identical fourth locking member 380 (FIG. 4) that opposes the third locking member 378. Accordingly, for brevity, only the third locking member 378 will be discussed below. The third locking member 378 extends inward relative to the central vertical axis 206 from the wall 359. The third locking member 378 includes a first major surface 382 that faces the first end 202 of the locking sleeve 140, a second major surface 384 opposite the first major surface 382 that faces the second end 204 of the locking sleeve 140, a first minor surface 386 that faces the second side 210, a first curved surface 388 that faces the central vertical axis 206, and a second curved surface 390 that faces toward the central vertical axis 206. The first major surface 382 extends inward relative to the central vertical axis from the wall 359 to the first curved surface 388 and the second curved surface 390. The first curved surface 388 concavely curves from the first minor surface 386 to the second curved surface 390. As will be discussed in further detail below, the curve of the first curved surface 388 corresponds to a curve of the hose 144. The second curved surface 390 concavely curves from the first curved surface 388 to the second major surface 360. The first curved surface 388 and the second curved surface 390 extend longitudinally relative to the central vertical axis from the first major surface 382 to the second major surface 384. The second major surface 384 extends outward relative to the central vertical axis 206 from the first curved surface 388 and the second curved surface 390 to the second major surface 360. The first minor surface 386 extends longitudinally relative to the central vertical axis 206 from the first major surface 382 to the second major surface 384. Furthermore, the first minor surface 386 abuts the third major surface 362.

The slidable locking mechanism 304 has a width 392 measured between the circular surface 374 and the circular surface 376 through the central vertical axis 206. The width 392 is greater than the width between aperture 348. Since the width 392 is greater than the width between apertures 348, when the slidable locking mechanism 304 is moved in a direction parallel to the central horizontal axis 212, the first spring mechanism 370 and the second spring mechanism 372 contact the surface 316.

In one particular embodiment, the slidable locking mechanism 304 is formed from a uniform, monolithic member formed from a suitably rigid material so as to withstand deformation when the hose assembly 102 of the present disclosure moves through the locking mechanism housing 302. The slidable locking mechanism 304 may be fabricated from a polymer material; however other rigid materials are entirely contemplated. Furthermore, the integral structure of the slidable locking mechanism 304 may be fabricated from multiple elements having similar configurations as one having skill in the art would understand.

Figure 4:
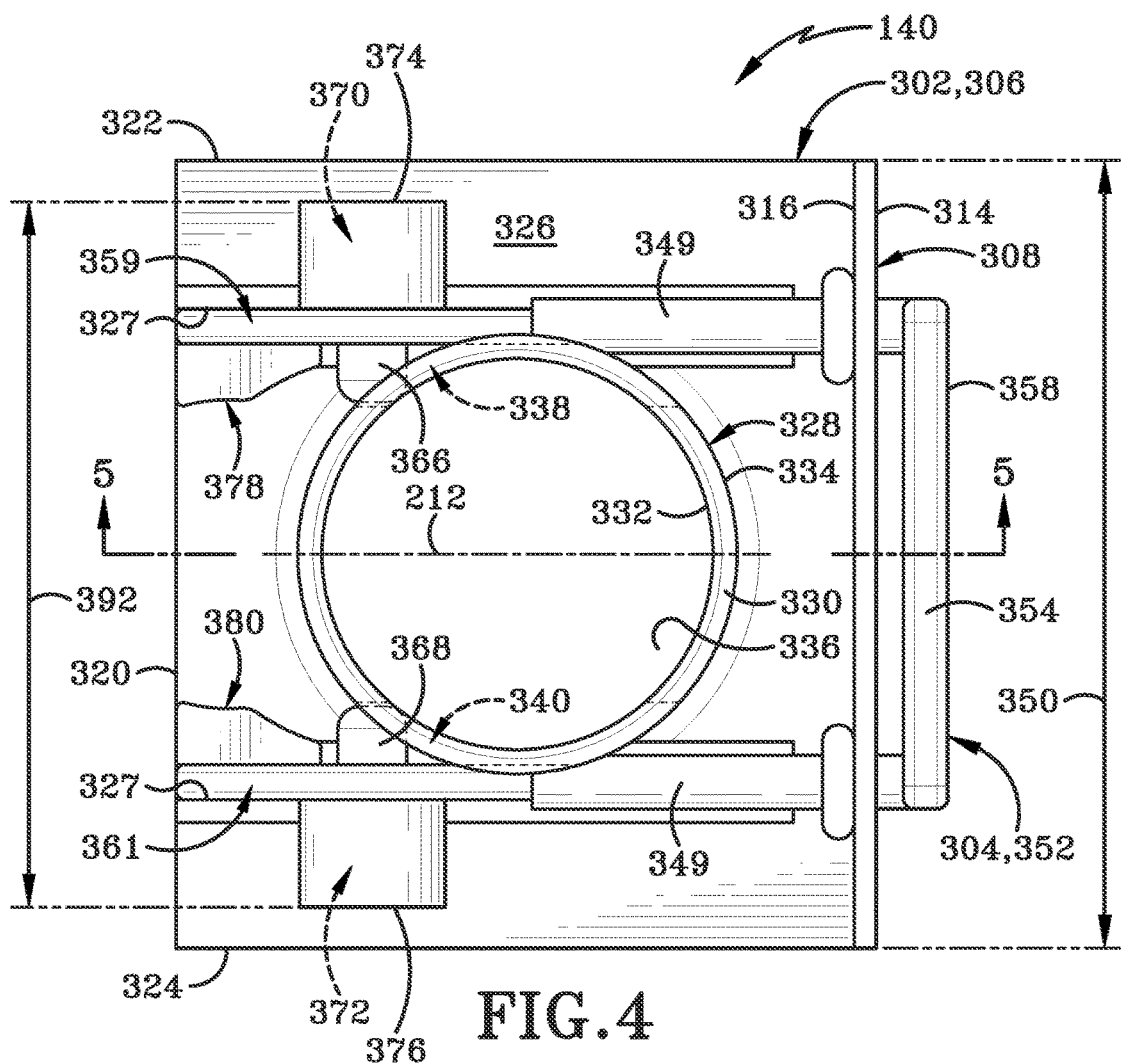
FIG. 4 is a top plan view of the locking sleeve shown in FIG. 2.

FIG. 4 depicts the locking mechanism housing 302 coupled to the slidable locking mechanism 304, wherein the slidable locking mechanism 304 is in a first position or an unlocked position. When the slidable locking mechanism 304 is coupled to the locking mechanism housing 302 and in the first position (FIG. 4), the two grooves 327 slidably receive wall 359 and wall 361 allowing the frame 352 to slide horizontally.

Figure 5:
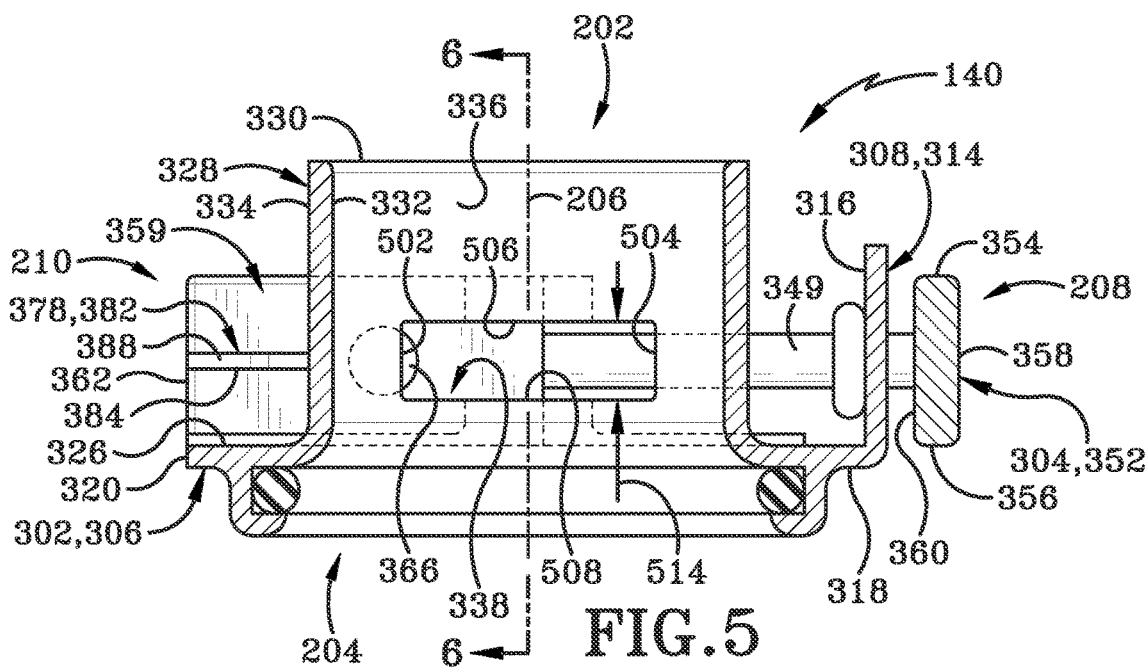
FIG. 5 is a cross sectional view of the locking sleeve shown in FIG. 4 taken along the line 5-5 where the locking sleeve is in a first position.

FIG. 5 further depicts the locking mechanism housing 302 coupled to the slidable locking mechanism 304, wherein the slidable locking mechanism 304 is in the first position. As shown in FIG. 5, the second slot 340 is generally horizontally rectangular. The slot 338 includes a first side 502, a second side 504 that opposes the first side 502, and a first end 506 and a second end 508 that opposes the first end 506. The first side 502 and the second side 504 extend generally parallel to the central vertical axis 206. The first end 506 and the second end 508 extend generally perpendicular to the central vertical axis 206. The slot 338 has a height 514 measured between the first end 506 and the second end 508 parallel to the central vertical axis 206.

Figure 6:
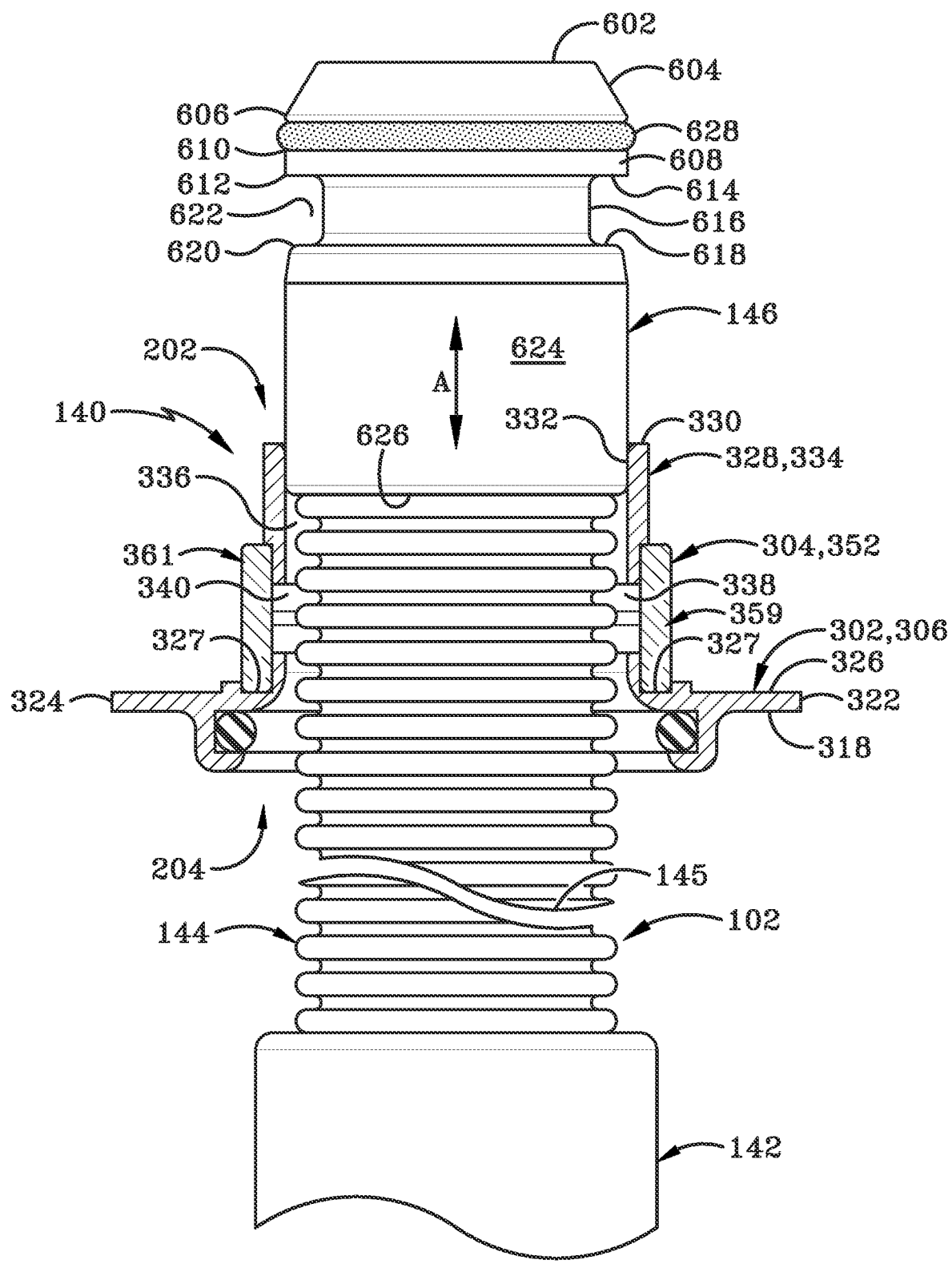
FIG. 6 is a cross sectional view of the locking sleeve shown in FIG. 5 taken along the line 6-6 with a hose assembly of a central vacuum system.

When the slidable locking mechanism 304 is in the first position, the first locking member 366 contacts the second surface 334 of the coupler 328 and contacts the first side 502 second slot 340. This contact compresses the first locking member 366 into the bore of the frame 352 and into the first spring mechanism 370. As such, the first locking member 366 does not extend through the slot 338. As further shown in FIG. 5, when the slidable locking mechanism 304 is in the first position, the third locking member 378 does not extend through the slot 338. Thus, when the slidable locking mechanism 304 is in the first position, neither the first locking member 366 nor the third locking member 378 couple to the hose assembly 102. As such, the hose assembly 102 may move in either direction of arrow A (FIG. 6). For instance, the hose assembly 102 may fully extend through the locking sleeve 140 and be removed from the valve box 100 for use at another inlet valve or may fully retract into the conduit 128 for storage.

As depicted in FIG. 6, the hose cuff 146 includes a first annular surface 602. The first annular surface 602 defines a first opening of the hose cuff 146. An annular pitched or tapered surface 604 extends from the first annular surface to a first outer edge 606. A first outer surface 608 extends longitudinally from a second outer edge 610 to a third outer edge 612. A second annular surface 614 extends radially inward from the third outer edge 610 to a second outer surface 616. The second outer surface 616 extends longitudinally from the second annular surface 614 to a third annular surface 618. The third annular surface 618 extends from the second outer surface 616 to a fourth outer edge 620. A fourth outer surface 624 extends from the fourth outer edge 620 to fourth annular surface 626. The fourth annular surface 626 defines a second opening of the hose cuff 146. A seal 628 nests between the first outer edge 606 and the second outer edge 610. The seal 628 is the radial outermost portion of the hose cuff 146. The seal 628 is a generally annular or ring like member defining an interior aperture. In one particular embodiment, first seal 628 is generally shaped like a torus such that it has a convexly curved continuous outer surface. The seal 628 may generally be referred to as an O-ring having elastomeric properties.

Figure 7:
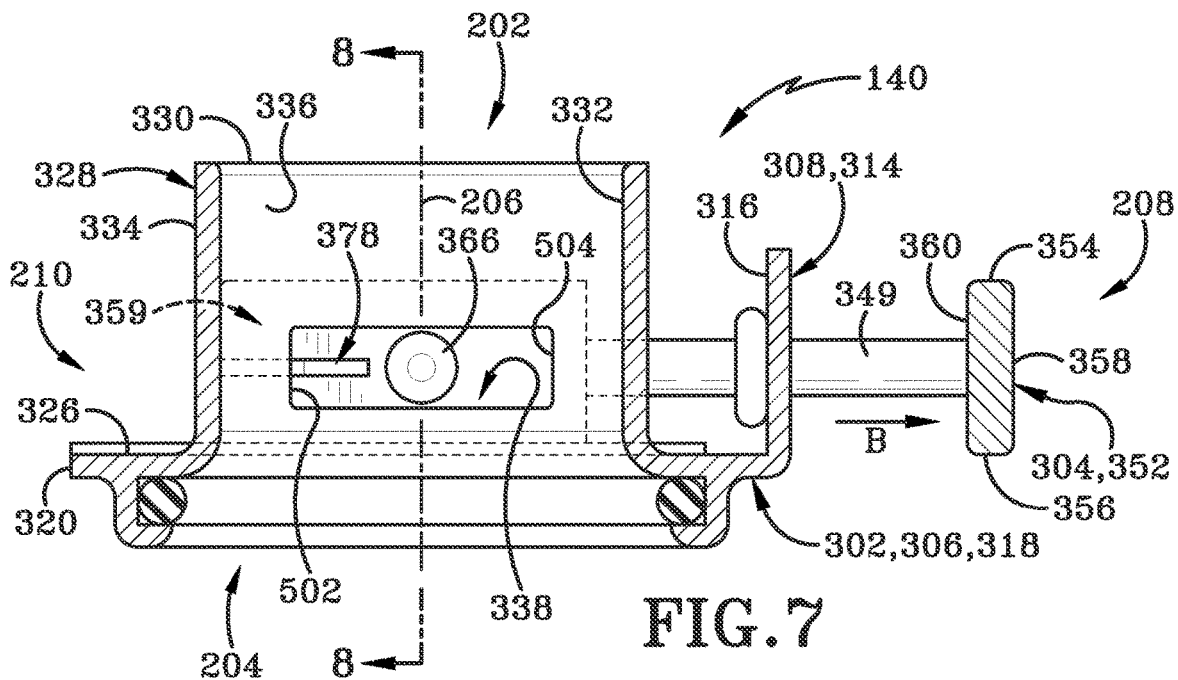
FIG. 7 is another cross sectional view of the locking sleeve shown in FIG. 4 taken along the line 5-5 where the locking sleeve is in a second position.

FIG. 7 depicts the locking mechanism housing 302 coupled to the slidable locking mechanism 304, wherein the slidable locking mechanism 304 has been moved in the direction of arrow B to a second position or a fully extended hose locking position. When the slidable locking mechanism 304 is in the second position, the first locking member 366 does not contact the first side 502 of the slot 338. As such, the spring of the first spring mechanism 370 is decompressed thereby fully extending the first locking member 366 through the bore of the frame 352 and the second slot 340 into the bore 336 of the coupler 328. Furthermore, when the slidable locking mechanism 304 is in the second position, the first curved surface 388 of the third locking member 378 does not extend through the slot 338.

Figure 8:
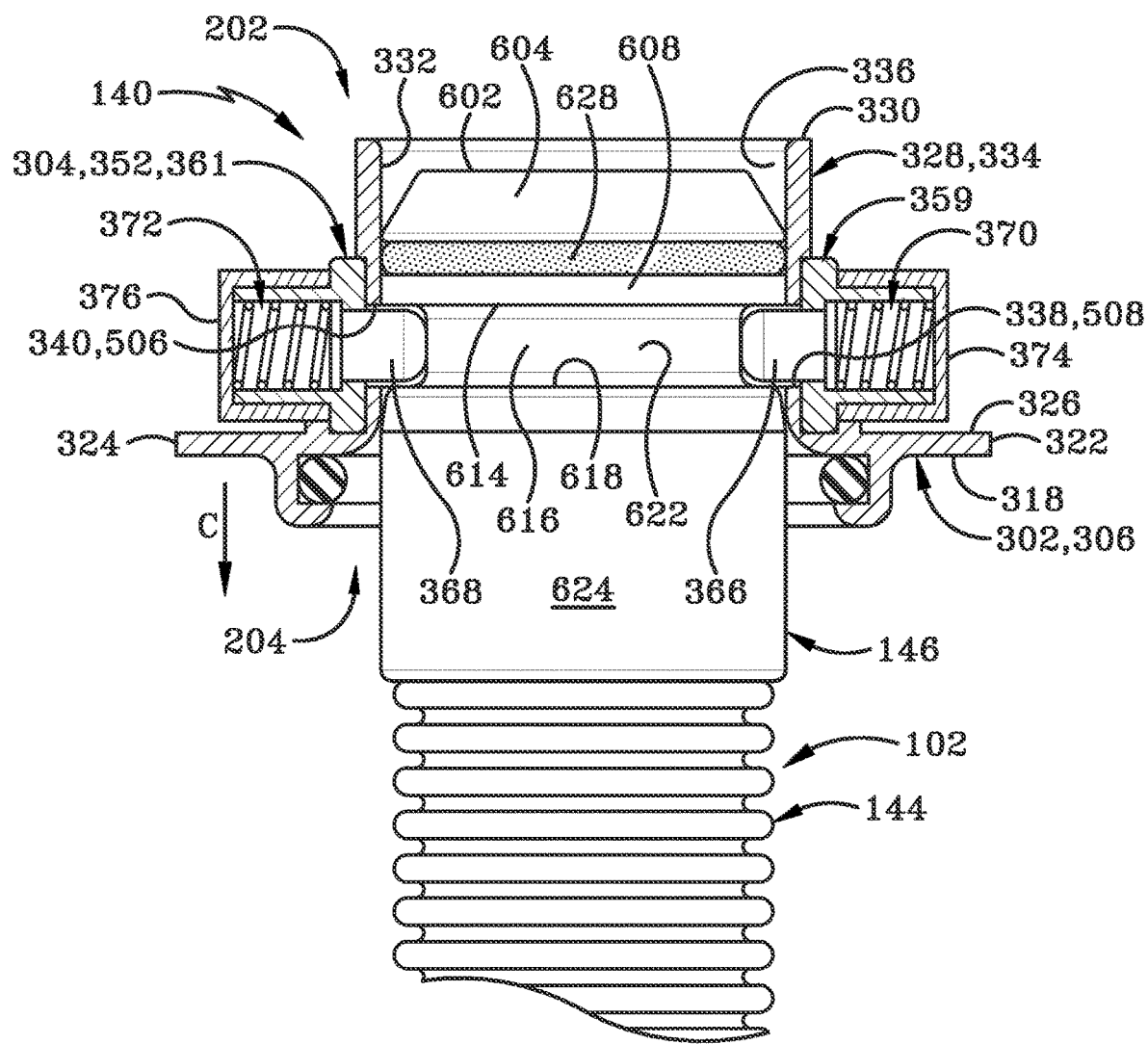
FIG. 8 is a cross sectional view of the locking sleeve shown in FIG. 7 taken along the line 8-8 coupled to a hose cuff of a hose assembly of a central vacuum system.

FIG. 8 depicts the locking sleeve 140 coupled to the hose cuff 146. When the hose assembly 102 is moved in the direction of arrow C first locking member 366 contacts either the hose 144 or the fourth outer surface 624 of the hose cuff 146 until it enters the channel 622 of the hose cuff 144. When contacting the hose 144 or the fourth outer surface 624, the first locking member 366 is compressed into the bore of the frame 352 and into the first spring mechanism 370. As such, the first locking member 366 does is not fully extend through the slot 338. When the hose assembly 102 is moved to the position shown in FIG. 8, the spring decompresses and the first locking member 366 fully extends through the slot 338 and into the channel 622 of the hose cuff 146. When in the channel 622, the first locking member 366 and the second locking member 368 nest between second annular surface 614 and the third annular surface 618 thereby locking the hose assembly 102 into a fully extended position. When in the fully extended positon, the seal 628 forms a generally hermetic seal with the coupler 328 of the locking sleeve 140.

Figure 9:
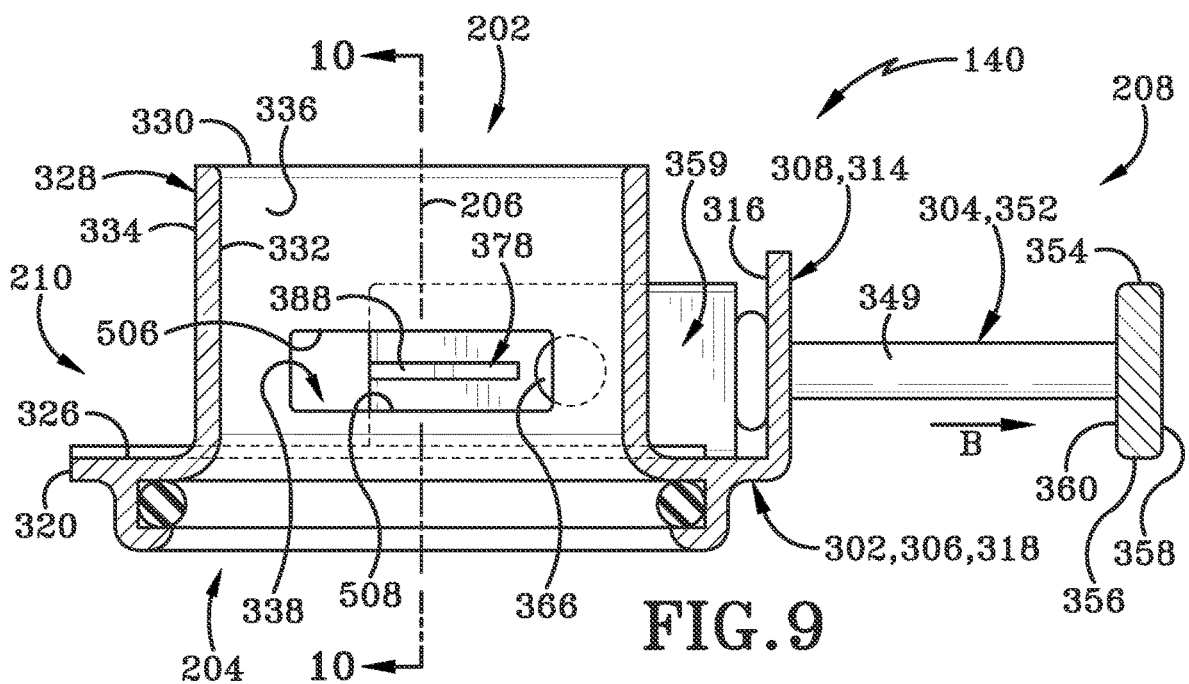
FIG. 9 is another cross sectional view of the locking sleeve shown in FIG. 4 taken along the line 5-5 where the locking sleeve is in a third position.

FIG. 9 depicts the locking mechanism housing 302 coupled to the slidable locking mechanism 304, wherein the slidable locking mechanism 304 has been moved in the direction of arrow B to a third position or a partially extended hose locking position. When the slidable locking mechanism 304 is in the third position, the first locking member 366 contacts the second surface 334 of the coupler 328 and contacts the second side 504 of the second slot 340. This contact compresses the first locking member 366 into the bore of the frame 352 and into the first spring mechanism 370. As such, the first locking member 366 does not extend through the second slot 340. As further shown in FIG. 9, when the slidable locking mechanism 304 is in the third position all of the third locking member 378 extends through the slot 338.

Figure 10:
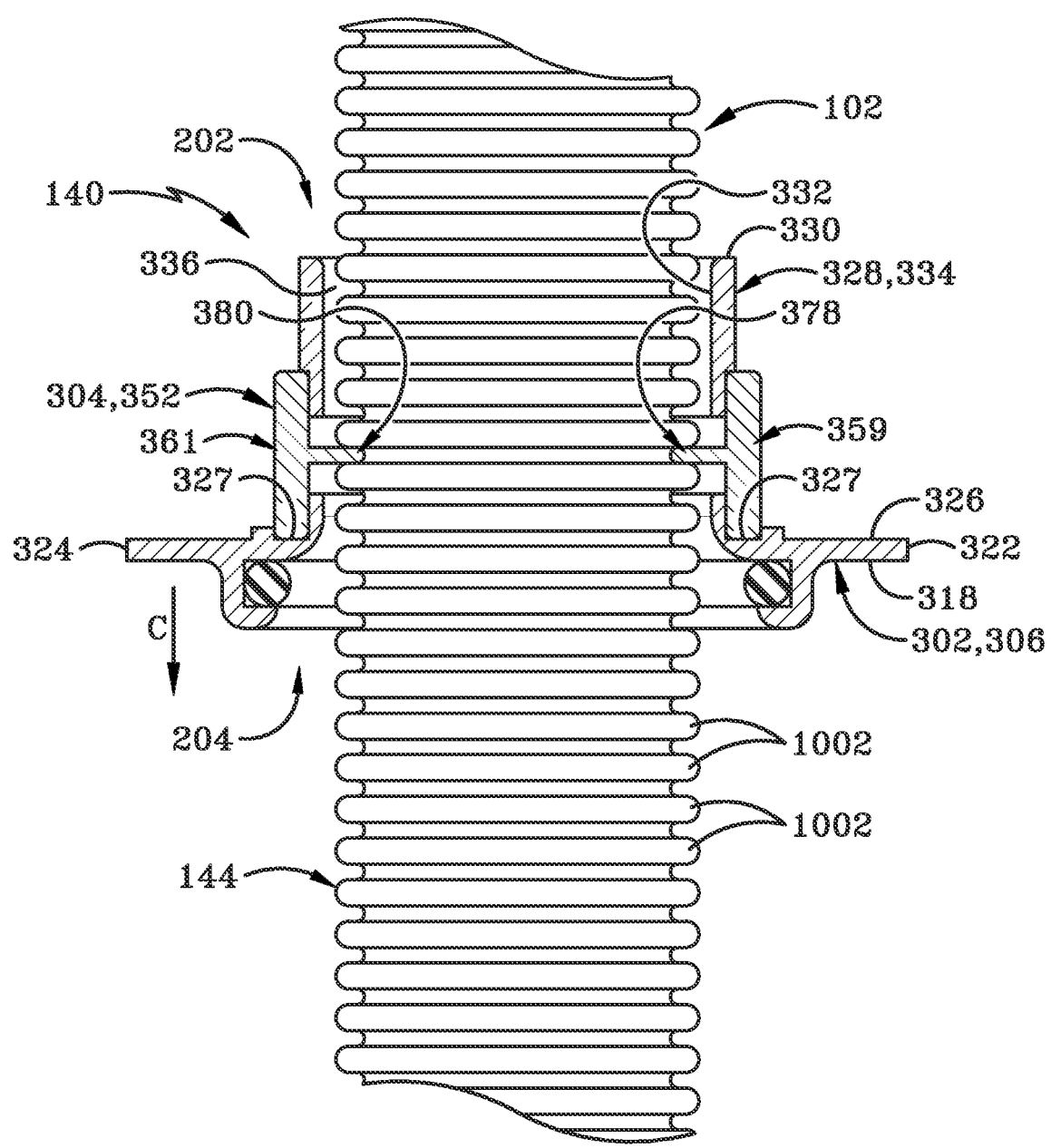
FIG. 10 is a cross sectional view of the locking sleeve shown in FIG. 9 taken along the line 10-10 coupled to a hose of a hose assembly of a central vacuum system.

FIG. 10 depicts the locking sleeve 140 coupled to the hose 144 of the hose assembly 102. A user may extend the hose 144 in the direction of arrow D to a desired position outside of the valve box 100. The desired position may be less than a fully extended position of the hose 144. When in the desired position, the user moves the slidable locking mechanism 304 to the third position (FIG. 9). The hose 144 includes a plurality of ribs 1002 extending from an outer surface 1004 of the hose 144. When in the third positon, the third locking member 378 and the fourth locking member 380 nest between two ribs 1002 of the hose 144. Furthermore, a curvature of the first curved surface 388 is complementary to a curvature of the outer surface 1004 of the hose 144. Since the third locking member 378 and the fourth locking member 380 nest between the two ribs 1002 and since the third locking member 378 and the outer surface 1004 of the hose 144 have similar curvatures, the third locking member 378 and the fourth locking member 380 couple to the hose 144 thereby locking the hose 144 to the locking sleeve 140 at the desired position. It is envisioned that locking sleeve 140 may lock the hose 144 at any position when the slidable locking mechanism 304 is in the third position so long as the third locking member 378 nests between two ribs 1002.

The first position of the slidable locking mechanism 304 the may correspond to an unlocked position. In this position, the hose assembly 102 may be completely removed from the valve box 100. The second position of the slidable locking mechanism 304 may correspond to a fully extended positon of the hose assembly 102. In this position, a user may extend the hose assembly 102 from the valve box 100 until the locking sleeve 140 couples to the hose cuff 146 of the hose assembly 102. The third position may correspond to a partially extended position of the hose assembly 102. In this position, after a user extends the hose assembly 102 to a selected or desired length from the valve box 100 that is less than the fully extended position, the locking sleeve 140 couples to the hose 144 of the hose assembly 102.

When the hose assembly 102 is stored within the valve box 100. The locking sleeve 140 may be in the first position which allows a user to partially or wholly remove the hose assembly 102 from the valve box 100. If a user desires to wholly remove the hose assembly from the valve box 100 in order to use the hose assembly with a different valve box 100, the user keeps the slidable locking mechanism 304 first positon as the locking sleeve 140 does not couple to the hose assembly 102 when in the first positon. The user may then completely remove the hose assembly 102 for use with a different valve box.

If a user desires to completely extend the hose assembly 102 so that the hose assembly may be used with the valve box 100, the user may move the slidable locking mechanism 304 to the second position. The user may move the slidable locking mechanism 304 to the second position from either the first position or the third position. In one example, a user may desire to extend all of the hose assembly 102 from the valve box 100 when the hose assembly 102 is stored in the valve box 100. In this positon, the locking sleeve 140 may be in the first position. Hence, the user may move the slidable locking mechanism 304 from the first position to the second positon and extend the hose assembly 102 from the valve box 100 until the locking sleeve 140 couples to the hose cuff 146. In another example, a user may have the partially extended the hose assembly 102 from the valve box 100 and then may desire to fully extend the hose assembly 102 for use with the valve box 100. In this example, the user may move the slidable locking mechanism 304 from the third positon to the second positon when a desired length of the hose assembly 102 has been removed from the valve box 100. In this position, the locking sleeve 140 couples to the hose 144.

If a user desires to partially extend the hose assembly 102 so that the hose assembly may be used with the valve box 100, the user may move the slidable locking mechanism 304 to the third position. In one example, a user may desire to partially extend the hose assembly 102 from the valve box 100 when the hose assembly 102 is stored in the valve box 100. In this positon, the locking sleeve 140 may be in the first position. Hence, the user may move the slidable locking mechanism 304 from the first position to the third positon and extend a desired amount of the hose assembly 102 from the valve box 100. After extending a desired amount, the user may move the slidable locking mechanism 304 from the first positon to the third position by sliding the locking mechanism beyond the second position. In this third position, the locking sleeve 104 couples to the hose 144. In the previous example, a user may have fully extended the hose assembly 102 for use with the valve box 100 and but now desires to use only a partial amount of the hose assembly 102. In this example, the user moves the slidable locking mechanism 304 from the second positon to the first position then retracts a desired amount of the hose assembly 102 into the valve box 100. When a desired amount of the hose assembly 102 remains outside of the valve box 100, the user moves the slidable locking mechanism from the first position to the third position. In this position, the locking sleeve 104 couples to the hose 144.

Based on the foregoing description, it now understood that the slidable locking mechanism is able to selective lock the hose 144 at various lengths relative to the valve box 100. As such, the slidable locking mechanism enables a great range of variety for the user by allowing the user to selectively choose a desired length of vacuum hose to extend from the valve box and that selected length of hose to be locked at a the selected length.

A user may desire to fully retract the hose assembly 102 into the valve box 100 for storage when the slidable locking mechanism 304 is in either the first, second or third position. If the slidable locking mechanism 304 is in the first position, the user does not move the slidable locking mechanism 304 and retracts the slidable locking mechanism 304 into the valve box 100. If the slidable locking mechanism 304 is in either the second or third positon, the user moves the slidable locking mechanism 304 into the first positon and retracts the hose assembly into the valve box 100.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The term slidable as used herein refers to an element that is capable of sliding or translating in a linear manner.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method for locking a hose assembly to a valve box assembly of a central vacuum system comprising:
    sliding a locking mechanism of the valve box assembly from an unlocked position to a first locked position;
    coupling the hose assembly to the locking mechanism when the locking mechanism is in the first locked position;
    wherein the locking mechanism is slid along an axis perpendicular to a longitudinal axis of the hose assembly from the unlocked position to the first locked position;
    wherein the locking mechanism is moveable between the first locked position and a different second locked position that is further offset from the hose assembly along the axis perpendicular to the longitudinal axis of the hose assembly than the first locked position;
    coupling the locking mechanism to a hose cuff of the hose assembly when the locking mechanism is in the first locked position;
    sliding the locking mechanism from the first locked position to the unlocked positon;
    moving the hose assembly into the valve box assembly to alter a length of hose extending from the valve box assembly;
    sliding the locking mechanism to the second locked position; and
    coupling the locking mechanism to a hose rib of the hose assembly when the locking mechanism is in the different second locked position.

2. A method for unlocking a hose assembly from a valve box assembly comprising:
    coupling a hose assembly to a locking mechanism of the valve box assembly when the locking mechanism is in a locked positon;
    sliding the locking mechanism from the locked position to an unlocked position, wherein sliding the locking mechanism includes sliding the locking mechanism along an axis perpendicular to a longitudinal axis of the hose assembly from the locked position to the unlocked position, wherein the locked position is further offset from the hose assembly along the axis perpendicular to the longitudinal axis than the unlocked positon;
    wherein the locked position is a first locked position and wherein the locking mechanism is slidable between the first locked position and a different second locked position that is further offset from the hose assembly along the axis perpendicular to the longitudinal axis of the hose assembly than the first locked position;
    coupling the locking mechanism to a hose of the hose assembly when the locking mechanism is in the different second locked position;
    sliding the locking mechanism from the different second locked position to the unlocked position; and
    unlocking the hose from the valve box assembly when the locking mechanism is in the unlocked position.

3. The method for unlocking a hose assembly from a valve box assembly of claim 2, further comprising
    coupling the locking mechanism to a hose cuff of the hose assembly when the locking mechanism is in the first locked position;
    sliding the locking mechanism from the first locked position to the unlocked positon; and
    unlocking the hose cuff from the valve box assembly when the locking mechanism is in the unlocked position.

* * * * *